United States Patent [19]

Vugrek

[11] 4,278,238
[45] Jul. 14, 1981

[54] CABLE FEEDING TOOL
[75] Inventor: Andrija Vugrek, Madison, N.J.
[73] Assignee: Western Electric Company, Inc., New York, N.Y.
[21] Appl. No.: 113,839
[22] Filed: Jan. 21, 1980
[51] Int. Cl.$^3$ .................. B05C 3/02; G01F 11/02; B65H 59/00
[52] U.S. Cl. .................. 254/134.3 FT; 118/405; 118/DIG. 18; 427/434.7
[58] Field of Search ............. 254/134.3 R, 134.3 FT, 254/134.38 A, 394, 398; 174/135; 118/405, DIG. 18; 427/434 E, 434 D

[56] References Cited
U.S. PATENT DOCUMENTS

| | | | |
|---|---|---|---|
| 2,629,768 | 2/1953 | Beil | 254/134.3 R |
| 3,110,479 | 11/1963 | Eitel | 254/134.3 R |
| 3,306,581 | 2/1967 | Miller | 254/134.3 FT |
| 3,394,920 | 7/1968 | Pomeroy . | |
| 3,491,189 | 4/1969 | Erb et al. . | |
| 3,863,897 | 2/1975 | Yeager | 254/134.3 R |
| 4,028,473 | 6/1977 | Conti . | |
| 4,202,530 | 5/1980 | Conti | 254/134.3 FT |

FOREIGN PATENT DOCUMENTS

293542  8/1968  U.S.S.R. .

Primary Examiner—Robert C. Watson
Attorney, Agent, or Firm—R. F. Kip, Jr.; J. L. Landis

[57] ABSTRACT

A tool for feeding telephone or other cable into a manhole comprises a pair of horizontally spaced wire rope lengths 121 grouped together to form part of a longitudinally elongated support frame resiliently warpable in the vertical plane into arcuate shapes. Coupled with and at opposite sides of such lengths are cable receiving and cable discharging sleeve units 30 and 31. Also coupled with such lengths between such units are a plurality of collar units 35 spaced from each other and units 30, 31. The units 30, 31, 35 form part of said frame and, when closed, extend around respective longitudinal passages for movement of a cable through the tool. All those units are selectively openable to permit sidewise insertion and removal of the cable from such passages. The unit 31 is further adapted to act as a lubricator for the cable.

5 Claims, 16 Drawing Figures

CABLE FEEDING TOOL

TECHNICAL FIELD

This invention relates to portable tools for feeding telephone, power or other cable in a guided and protected manner from above ground down into a manhole and then into an underground duct for the cable.

BACKGROUND OF THE INVENTION

A prior art cable feeding tool for telephone cable is commercially available from General Machine Products Company, Incorporated, 3111 Old Lincoln Highway, Trevost, Pa. 19407. Such tool is known as a "Split Cable Feeder" and comprises split entrance and exit sleeve units for the cable and an elongated, flexible split tubular structure joining those two sleeve units. The tubular structure would, if not split, be circular in cross section and of corrugated configuration in the longitudinal direction, and it would consist lengthwise of a large number of ring-like segments longitudinally interlocked with each other by crimping or overlapping of the corrugations of adjacent segments in a manner whereby those segments may relatively slide in frictional contact to angularly tilt relative to each other at the joint thereof, and whereby, accordingly, the structure as a whole is flexibly compliant and may be bent into various shapes which tend to be self-sustaining by virtue of the frictional contacts of such segments at such joints, but the structure will have no tendency to return to its original shape.

The described tubular structure has, however, the further feature that it is longitudinally split into upper and lower similar half-tube lengths of semi-circular cross section which are hingedly coupled on the backside of the tube by a series of hinges longitudinally spaced therealong and which, further, may, on the front side of the tube, be selectively coupled to, or uncoupled from, each other by a series of latch or hasp devices spaced along and secured to such tube on such front side. The half-tube lengths are coated with rubber to improve their structural integrity.

In operation, a cable may be inserted into or removed from the feeder in a sidewise manner (as opposed to leading the cable through the feeder) by opening the split sleeve units to separate the two halves of each thereof and by uncoupling at the front side of the tube the two half-tube lengths of the tube structure and then swinging these half-tube lengths away from each other at such front side while remaining coupled to each other by the hinged coupling thereof on the back side of the tube. After the cable has been sidewise inserted into or removed from the feeder, its split sleeve units are closed and the half-tube lengths thereof are recoupled on the front side of the tubular structure to again form a closed tube.

The described prior art cable feeder has the disadvantages that it is easily damaged, wears out rapidly, and, also, does not lend itself as well as desired to opening or closing of the tube structure because the entireties of the two halves of such structure must simultaneously be swung away from or towards each other.

Also known to the prior art from U.S. Pat. Nos. 3,394,920 and 3,411,189 are cable guide devices comprising an elongated flexible roller support consisting of articulated links (joined together as are the links in bicycle chains) and, also, rollers mounted by such support and over which the cable is passed. Such devices, however, are used for guiding cable around a bend in a duct therefor, are permanently installed and are to be distinguished from cable feeding tools.

SUMMARY OF THE INVENTION

It is, accordingly, an object of the invention to provide cable feeding tools which are rugged in any particular use and are also durable to have long, useful life.

Another object of the invention is to provide cable feeding tools of a kind facilitating sidewise movement of a cable into and out of the tool.

These and other objects are realized according to the invention by a cable feeding tool comprising a pair of horizontally spaced wire rope lengths grouped together to constitute part of a horizontally elongated support frame resiliently warpable in the vertical plane into arcuate shapes. The tool also includes cable receiving and cable discharging sleeve units disposed mostly beneath and at opposite ends of said lengths in coupled relation therewith to be supported thereby and to form part of such frame. Further, included in such tool is a plurality of collar units disposed mostly beneath such lengths between said sleeve units in spaced relation therefrom and from each other and in coupled relation with said lengths to be supported thereby and to form part of said frame. The sleeve units and collar units have respective longitudinal passages therein for movement through such passages of a cable.

It has been found that a cable feeding tool of the construction described above is rugged and durable. Preferably, the sleeve units and collars are selectively openable and closable to permit sidewise insertion and removal of the cable in relation to the tool in a manner which is facilitated in that it is not necessary to open and close structural means extending over the entire length of the tool between the sleeve units.

BRIEF DESCRIPTION OF THE DRAWINGS

For a better understanding of the invention, reference is made to the following description of a representative embodiment thereof and to the accompanying drawings wherein.

DETAILED DESCRIPTION OF STRUCTURAL ASPECTS

Figure 1:
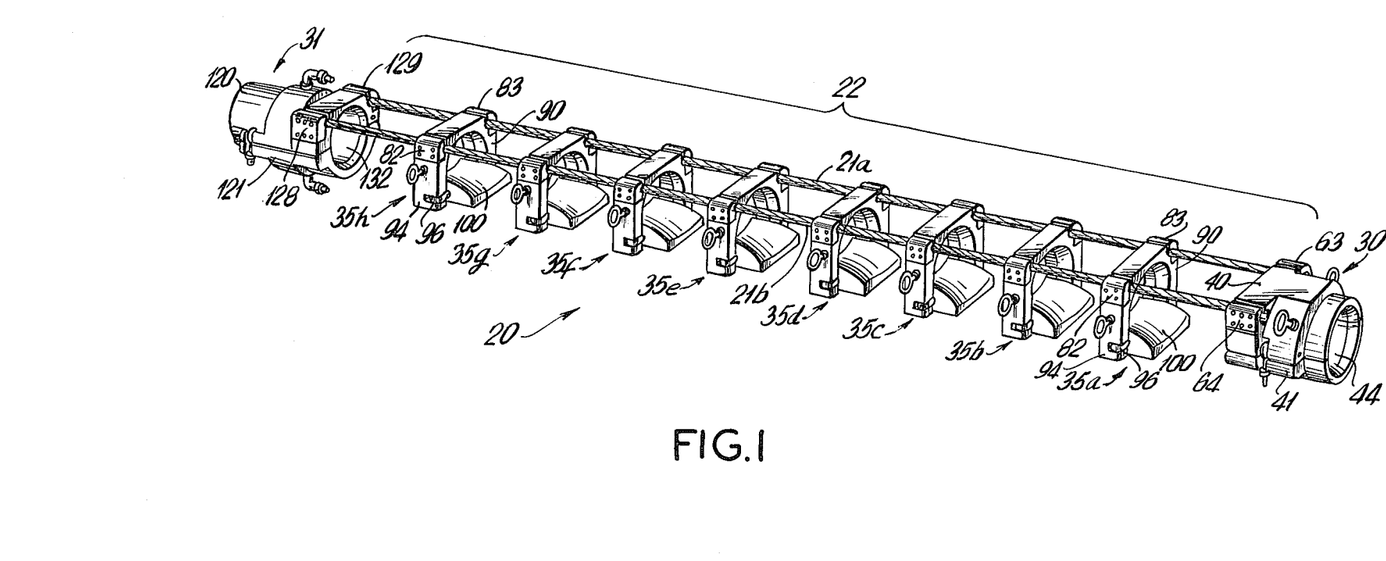
FIG. 1 is an isometric view of a cable feeding tool according to the invention when such tool is not in use.

Referring now to FIG. 1, the reference numeral 20 generally designates a cable feeding tool incorporating a pair of wire rope lengths 21a, 21b grouped together to form part of a horizontal longitudinally elongated frame 22 for the tool. As shown, the lengths 21 are parallel, coextensive and spaced apart in the horizontal plane. The wire rope of which lengths 21 are made is constituted of a multiplicity of helically wrapped strands of steel wire. Wire rope of such sort offers stiffness against warping but can be bent to assume various shapes departing from its original configuration, and, when so bent, such wire rope displays resilence as long as the elastic limit of the individual wire strands thereof is not exceeded to result in permanent deformation of the rope. Because of such resilence, the wire rope will return to approximately its original, resiliently unstressed, configuration when the strains thereon which warp it are removed.

Tool 20 has a configuration which, when its lengths 21 are resiliently unstressed, is, desirably, either linear as shown in FIG. 1 or a good approximation to linear. The tool may, however, be warped for purposes of use into various arcuate shapes in the vertical plane, such as, for example, an upwardly convex simple arc, a downwardly convex simple arc or compound arcuate curves. Because the lengths 21 of the tool have the characteristics described above for wire rope, such warping is opposed by resilent stiffness offered by such lengths, and, when the bending strains on the tool are removed, it will be caused by the resilence of lengths 21 to straighten out in the vertical plane to substantially resume its original orientation.

Disposed at opposite ends of the wire rope lengths 21 are two sleeve units, namely, a cable receiving sleeve unit 30 and a cable discharging sleeve unit 31. As shown, those sleeve units are both disposed mostly beneath wire rope lengths 21 and, also, are coupled to such lengths by virtue of the right-hand and the left-hand ends of lengths 21 being received in a clamped manner in respective channels formed at the top of, and on opposite sides of, respectively, the unit 30 and the unit 31. The lengths 21 thus support units 30 and 31 while they in turn form part of the frame 22 in that, with respect to that frame, they act as transverse cross members serving to maintain the lengths 21 apart in their shown horizontally spaced relation.

Tool 20 also includes eight collar units 35a–35h disposed mostly beneath wire lengths 21 and distributed lengthwise therealong between units 30, 31 in spaced relation with those units and with each other. The collar units are coupled to wire lengths 21 in the same way as are the sleeve units 30, 31 and also form part of frame 22 in that units 35 act as cross members thereof which serve to hold the lengths 21 apart in their shown horizontally spaced relationship.

Frame 22 thus has a "ladder" structure constituted of a pair of resilient elongated side members 21, 21b joined and held in relation to each other by a plurality of cross members 30, 31, 35. Because of that "ladder" structure, frame 22 is, as described, resiliently warpable in the vertical plane into various arcuate shapes, but on the other hand, is not easily deformable in the horizontal plane.

FIGS. 3–6 inclusive show details of cable receiving sleeve unit 30. Such unit consists of an upper sleeve portion 40 and a lower sleeve portion 41 having downward-facing and upward-facing semicylindrical interior bounding walls 42 and 43, respectively, formed therein such that (FIG. 5), when these two portions are juxtaposed, the unit encloses a circular cylindrical longitudinal passage 44 therethrough.

Upper portion 40 has formed in one side thereof (FIGS. 4 and 5) a pair of vertical slots 45a, 45b in which are received downwardly extending swing bolts 46a, 46b hingedly coupled to said upper portion by a pin 47 received in a horizontal hole 48 and passing through the hole, across the slots and, while in said slots, through eyes (not shown) formed in the enlarged heads of the swing bolts. The swing bolts pass downwardly through holes (not shown) in lower portion 41 to project from such holes beyond the downward facing surface of a shoulder 50 on the side of such portion. Portion 41 is secured to such bolts by nuts 51a, 51b threadedly received on the lower ends of the swing bolts. Sleeve portion 41 is thus hinged by such bolts to be movable towards and away from the upper portion 40 in the manner shown in FIG. 5.

On the side opposite from where they are hinged, the upper and lower portions 40, 41 have formed therein a pair of vertically registering slots 52, 53. A swing rod 54 is pivotally mounted in slot 52 by a pin 55 passing through a horizontal hole 56 in upper portion 40 and across slot 52 and, while in such slot, through an eye 56 formed in the radially enlarged head of rod 54. By virtue of being so pivotally mounted, rod 54 is swingable into and out of slot 53. When received in such slot, advancing rotation of a nut 57 on the threaded lower end of the rod will advance a washer 58 on the rod above the nut and engaging the downward facing horizontal surface of a shoulder 59 formed on that side of lower portion 41. Sufficient rotation of nut 57 will cause the unhinged side of lower portion 41 to be drawn up securely against the corresponding side of upper portion 40.

For purposes of securing the sleeve unit 30 to wire rope lengths 21, the rear end of the upper sleeve portion 41 has on opposite sides of, and near the top of, such portion, a pair of horizontal, outwardly facing semicylindrical grooves 61, 62. Outward of those grooves are a pair of clamp blocks 63, 64 resting on shoulders 65, 66 projecting transversely outward from sleeve portion 40. Blocks 63, 64 have formed in their inner faces a pair of respective horizontal semicylindrical grooves 67, 68 registering with, respectively, grooves 61, 62. Clamp blocks 63, 64 may be drawn toward the center of sleeve 40 by the rotation of Allen head screws 69 and 70 passing through horizontal transverse holes (not shown) in the blocks and then into threaded holes in the sleeve portion.

The sleeve unit 30 is secured to rope wire lengths 21a and 21b by inserting portions of those lengths into the respective channels formed between grooves 61, 67 and the grooves 62, 68 and by then turning the screws 69, 70 to draw the clamp blocks tight against the mentioned portions of the wire rope lengths 21 to thereby clamp unit 30 to those lengths.

For purposes of mooring the cable feeding tool 20, sleeve unit 30 is provided with a pair of eye rings 75, 76 on opposite sides of, and at a longitudinally intermediate location on, upper sleeve portion 40, the rings 75, 76 projecting upwardly and outwardly at that location from such sleeve portion.

FIGS. 7-10 show details of the collar unit 35a which is structurally identical to the remaining collar units 35b-35h. Collar unit 35a is clampled near its top to the wire rope lengths 21 by an arrangement of outwardly facing grooves 80, 81, clamp blocks 82, 83, inward facing grooves 84, 85 in such blocks, and block securing screws 86 which (arrangement) is similar to that already described in connection with sleeve unit 30.

A primary component of unit 35a is a yoke 90 peripherally extending entirely around a longitudinal passage 91 through the unit except for a gap at the bottom of the yoke between the lower ends thereof. Such gap may be selectively opened and closed (to permit sidewise insertion into, and removal from, the passage 91 of a cable) by selective positioning of movable gap closure means which in unit 35a takes the form of swingable arm means 92 of the following character. The yoke 90 has formed in a lower end 94 thereof a horizontal slot 95 extending from the front of such lower end partway to the rear thereof. A stub 96 with a vertical eye hole (not shown) therein is received in slot 95 and is pivotally mounted therein by a screw (not shown) passing upwardly from the bottom of lower end 94 through a hole therein (not shown) and into slot 95, and, from thence, through the eye hole of stub 96 and, finally, into a threaded hole (not shown) in end 94 above slot 95, the mentioned screw having threads on its upper end engaging with the threads of such hole.

Stub 96 is coupled to one side of a cable guide member 100 from the other side of which there projects a horizontal rod 101 adapted to be horizontally swung in and out of a shallow horizontal slot 103 (FIG. 10) formed in the lower end 104 of yoke 90. Slot 103 is intersected by a vertical slot 105 formed in end 104 somewhat to the rear of the front face 106 of that end. A toggle 107 is rockably mounted within slot 105 by a pin 108 passing from front face 106 into slot 105, through a hole 109 in the toggle, and then into a threaded hole (not shown) formed in the opposite wall of slot 105. The rear end of toggle 107 is biased downward by a compression spring 110 to force the top of a toggle head 111 at the front of the toggle into contact with the upper boundary wall of the horizontal slot 103. As the rod 101 is swung inward towards slot 103, it strikes a sloping cam face 112 on head 111 so that, with further inward motion of the rod, the head 111 is forced down against the bias of spring 110 to permit the rod to pass the head. The head then flies up under bias force from spring 110 to latch rod 101 in place between a rear vertical shoulder 113 on the head and the rounded back wall of the slot 103. Rod 101 can be subsequently unlatched by manually pressing down on cam face 112 (which, as shown, projects in part out of slot 103) until the rod can clear head 111, and by then moving the rod 101 out of slot 103 past head 111. The head is then manually released, and its flies up under the bias spring 110 to resume its original position.

The particular form of the cable guide member 100 is not part of the present invention. Thus, for example, rod 101 may be connected to stub 96 and the central part of that rod may act as a shaft for a cable guiding roller rotatably mounted on such shaft. Preferably, however, guide member 100 is in the form of the shown block integrally secured to stub 96 and to which rod 101 is in turn secured by being fixedly secured in a hole therein (not shown). Desirably, the upper surface of such block is contoured as shown to guide, and ease the sliding thereover of, a cable moving through the passage 91 encircled by the collar unit 35a.

As depicted, the yoke 90 of collar unit 35a has to eye rings 115 mounted on opposite sides thereof for purposes of mooring the tool 20.

FIGS. 11-16 inclusive show details of the cable discharging or exit sleeve unit 31. Like unit 30, the sleeve unit 31 is divided into an upper sleeve portion 120 and a lower sleeve portion 121 hingedly coupled on one side to upper portion 120 by an arrangement including swing bolts 122a, 122b (FIG. 12) which is similar to the hinge arrangement already described for unit 30. Further, on its side opposite from its hinged coupling, lower portion 121 may be drawn up tight against upper portion 120 by a fastening arrangement including swing rod 123 which (arrangement) is similar to the fastening arrangement with a swing rod which has been earlier described in connection with unit 30. Still further, the sleeve unit 31 is clamped to the wire rope lengths 21 by an arrangement of registering grooves 124, 125 and 126, 127, clamp blocks 128, 129 and screws 130 similar to the corresponding clamping arrangement of sleeve unit 30.

Figure 14:
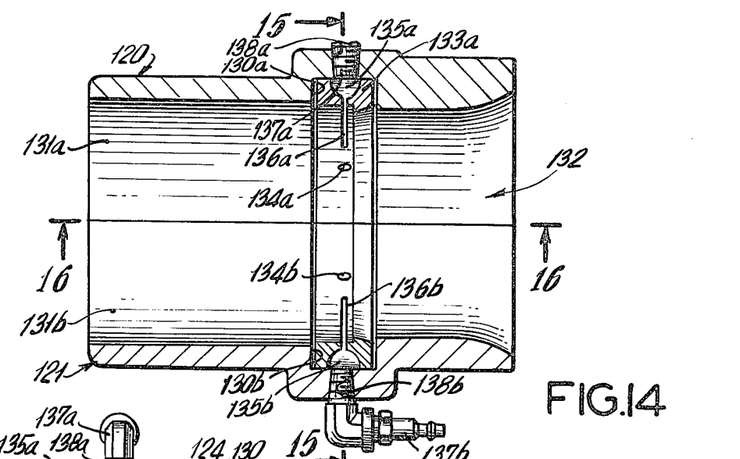
FIG. 14 is a side elevation in cross section of the FIG. 11 unit, taken as indicated by the arrows 14—14 in FIG. 11.
Figure 15:
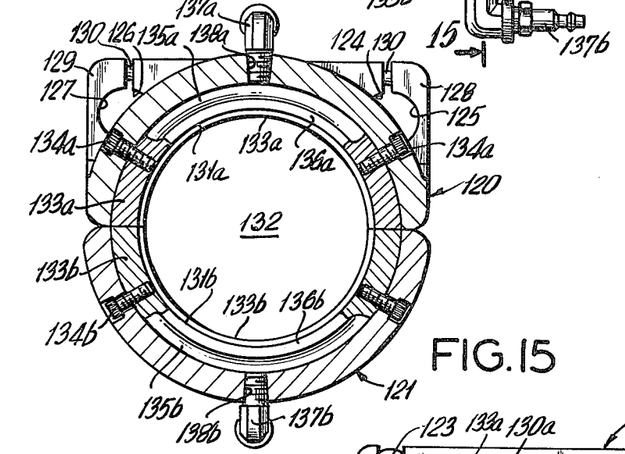
FIG. 15 is a rear elevation in cross section of the FIG. 11 unit, taken as indicated by the arrows 15—15 in FIG. 14.

As a difference between unit 30 and unit 31, the latter is adopted to serve as a lubricator for cable passing through the tool by being structurally modified as follows. Considering upper sleeve portion 120 (FIGS. 14-16), a semicircular groove 130a of rectangular longitudinal cross-section is formed in the semicylindrical bottom wall 131a 1 of portion 120. A half-ring 133a is seated in groove 130a and secured in place therein by screws 134a (FIG. 15). Half-ring 133a has formed in the upper part thereof a concave channel 135a peripherally extending to either side of the top of the half-ring part way to the lower ends thereof. A narrow arcuate slot 136a passes from the bottom of channel 135a downward through the half-ring 133a to open into the passage 132. A cable lubrication fitting 137a is mounted on the the top of upper sleeves portion 120 by being received in a tapped hole 138a passing downward through such portion to open into channel 135a. Cable lubricant which is pumped through fitting 137a will fill channel 135a and then pass through slot 136a to deposit on top of a cable moving through passage 132.

Figure 16:
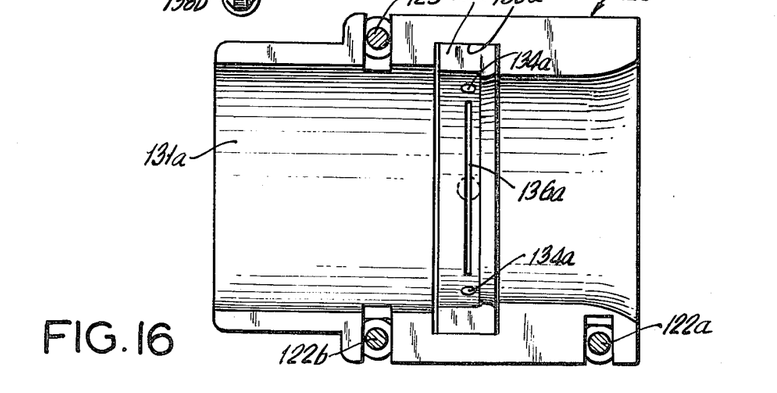
FIG. 16 is a bottom view of the upper sleeve portion of the FIG. 11 unit, taken as indicated by the arrows 16—16 in FIG. 14.

Lower sleeve portion 121 is symmetrical with upper sleeve portion 120 in that portion 121 has elements 130b, 131b, 133b-138b which are respective counterparts of the elements 130a, 131a and 133b-138b incorporated in upper portion 120. Accordingly, cable lubricant pumped through lower fitting 137b will deposit on the bottom of a cable moving through passage 132.

USE AND DETAILS OF CONSTRUCTION

Figure 2:
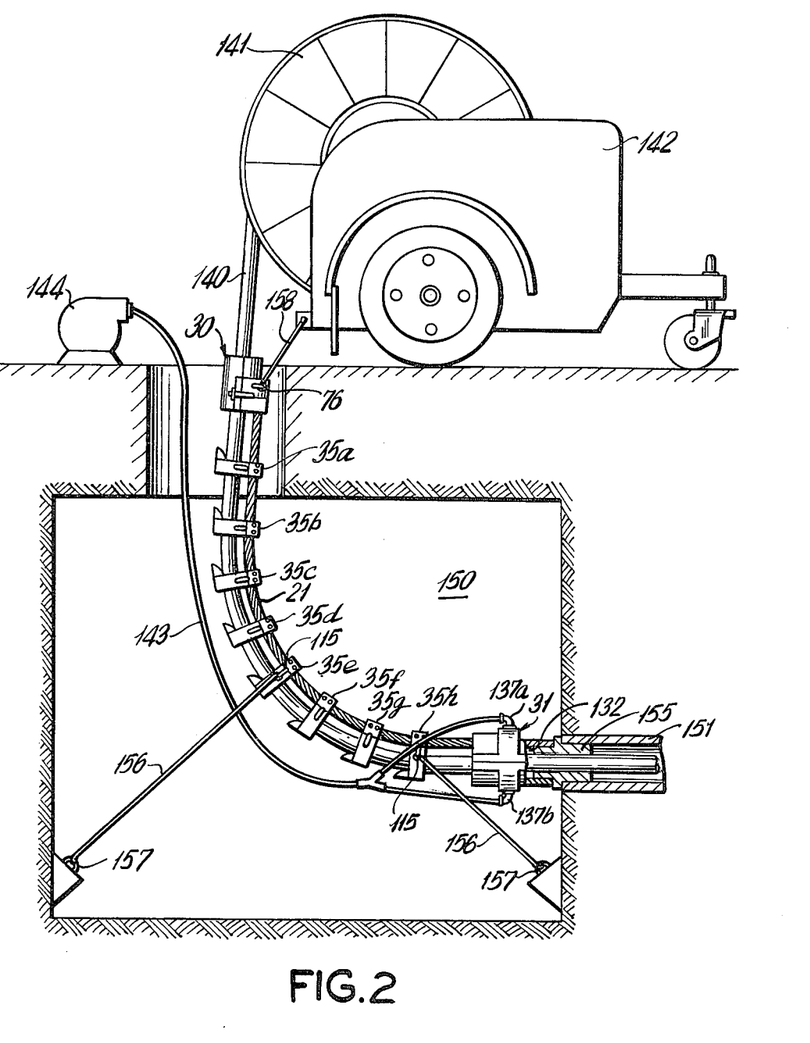
FIG. 2 is a schematic view of such tool of FIG. 1 when in use.
Figure 3:
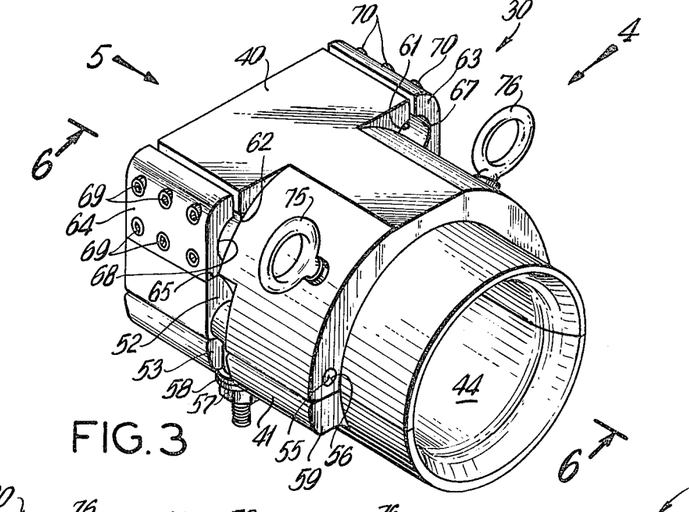
FIG. 3 is an isometric view of the cable receiving or entrance sleeve unit of the FIG. 1 tool.
Figure 4:
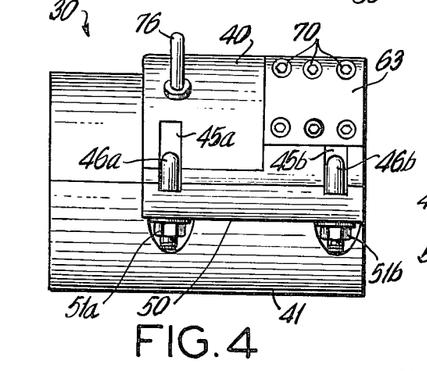
FIG. 4 is a side elevation view of the FIG. 3 sleeve unit, taken as indicated by the arrow 4 in FIG. 3.
Figure 5:
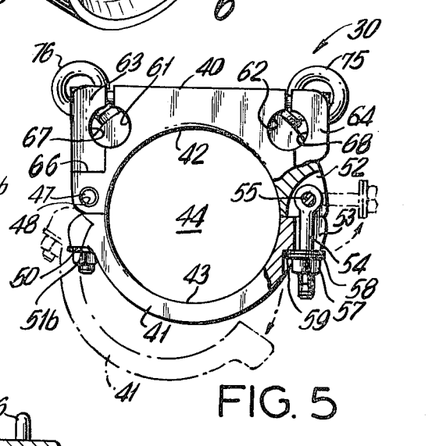
FIG. 5 is a rear elevation view of the FIG. 3 sleeve unit, taken as indicated by the arrow 5 in FIG. 3.
Figure 6:
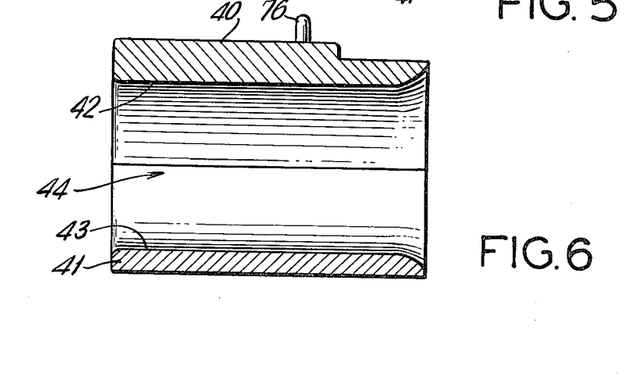
FIG. 6 is a side elevation view in cross section of the FIG. 3 sleeve unit, taken as indicated by the arrows 6—6 in FIG. 3.
Figures 7, 8:
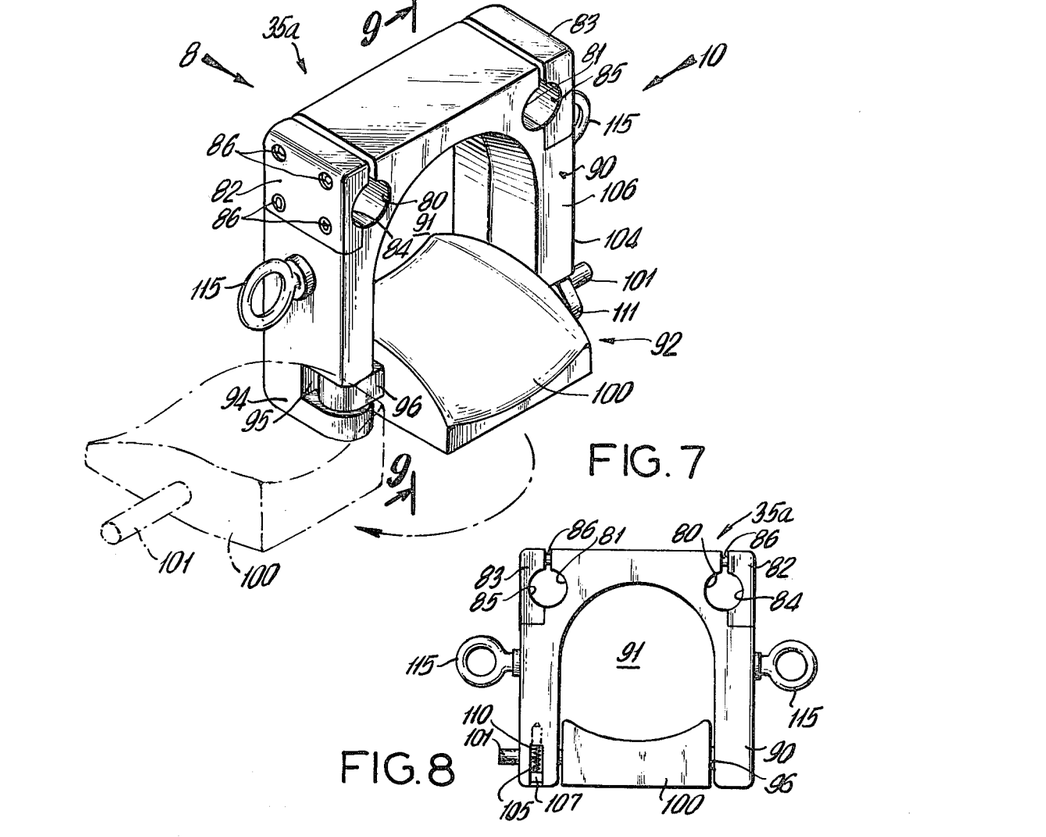
FIG. 7 is an isometric view of one of the collar units of the FIG. 1 tool.
FIG. 8 is a rear elevation of the FIG. 7 unit, taken as indicated by the arrow 8 in FIG. 7.
Figure 9:
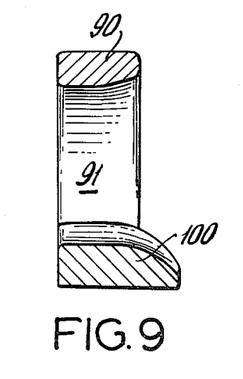
FIG. 9 is a side elevation in cross section of the FIG. 7 unit, taken as indicated by the arrows 9—9 in FIG. 7.
Figure 10:
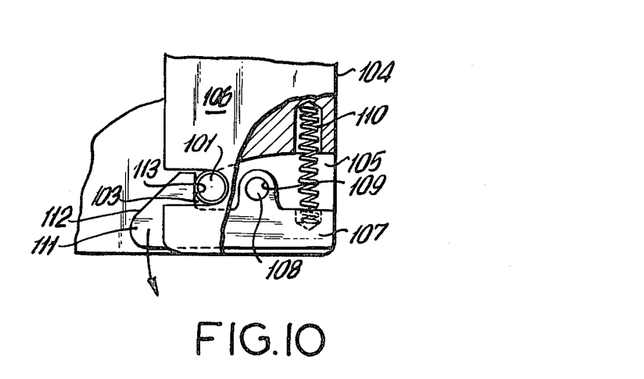
FIG. 10 is a side elevation of the FIG. 7 unit, taken as indicated by the arrow 10 in FIG. 7, with a portion of the unit being cut away.
Figure 11:
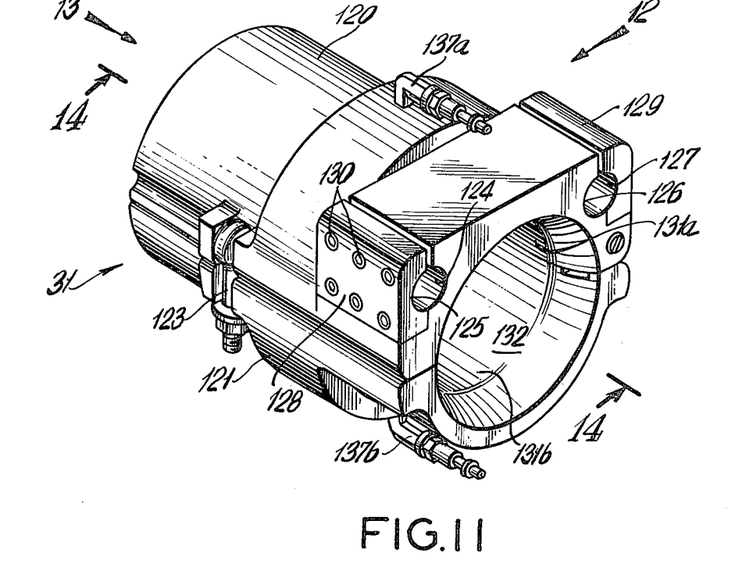
FIG. 11 is an isometric view of the cable discharging or exit sleeve unit, serving also as a cable lubricator.
Figure 12:
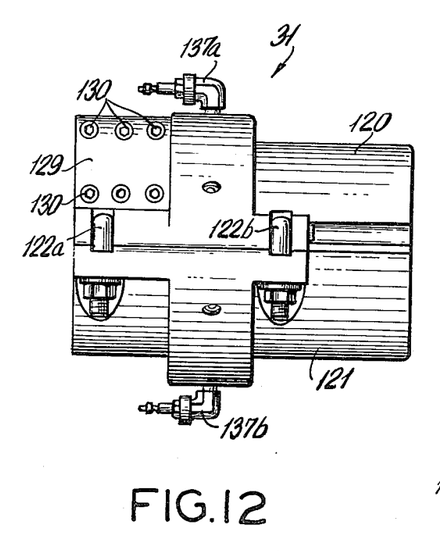
FIG. 12 is a side elevation of the FIG. 11 unit, taken as indicated by the arrow 12 in FIG. 11.
Figure 13:
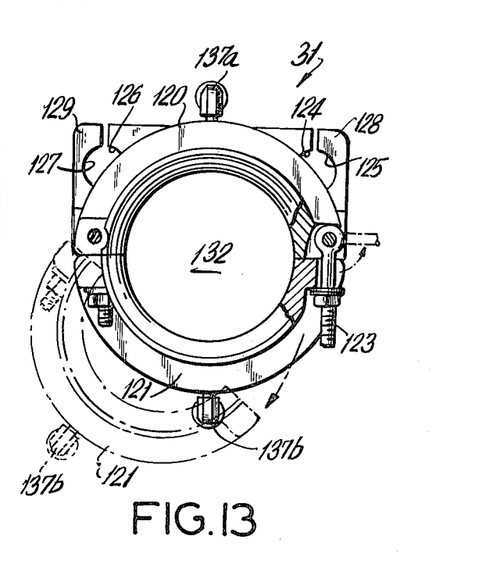
FIG. 13 is a rear elevation of the FIG. 11 unit, taken as indicated by the arrow 13 in FIG. 11.

FIG. 2 illustrates schematically an exemplary use of the cable feeding tool 20. While the tool is still above ground, a short length of a telephone cable 140 on a reel 141 rotatably mounted on a vehicle 142 is paid off from the reel. The sleeve units 30 and 31 and the collar units are opened in the manner heretofore described to permit sidewise movement of the cable into the longitudinal passages through those units and, once a front part of the cable has been placed in such passages, all the mentioned units of the cable are closed to lock it into those passages. A hose 143 is connected at its rear to a cable lubrication pump 144 and, at its front, by a "Y" formed by two hose branches 145a, 145b, to the fittings 137a, 137b of the exit sleeve unit 31.

After those preliminary operations have been completed, the tool 20 with the front part of cable 140 therein is lowered into a manhole 150 into which opens a duct 151 for the cable. The front end of the cable has on it a pulling eye (not shown) connected to a rope (not shown) which runs through duct 151 to permit the pulling therethrough of cable 140. For purposes of aligning the cable discharging end of tool 20 with duct 151, the passage 132 through sleeve unit 31 has received therein one end of a nozzle 155 of which the other end is received in duct 151, the cable 140 passing through the nozzle. Also to assure pulling of the cable with a minimum of friction the tool is resiliently warped into a desired arcuate shape by tie ropes 156 which, at one end, are tied to anchor eyes 157 in the manhole and, at the other end, are tied by "Y" bridles (at the unanchored ends of the ropes) to pairs of eye rings 115 on selected ones of the collar units 35. The tool 20 is supported in the manhole by a further tie rope 158 connected at one end to vehicle 142 and, at the other end, by a "Y" bridle to the eye rings 75, 76 on the sleeve unit 30.

Having warped tool 20 into its desired arcuate shape, a pump 144 is started to force cable lubricating fluid through hose 143 into sleeve unit 31 such that, as heretofore described, the fluid will be deposited on the top and bottom of cable 140. The cable is then pulled through duct 151, being lubricated as it goes and, in the course of such pulling, being guided and protected in manhole 150 by the tool 20.

Assume now that, by such pulling, all of the cable as been paid off reel 141, and that the cable is terminated at its rear end by a splice case too large to pass through tool 20 when the various sleeve and collar units thereof are closed. To permit passage of the splice case into a manhole 150, sleeve units 30 and 31 and all of the collar units may be opened, and the tool then removed sidewise from the cable. Ropes 156 are then untied to permit the tool to resiliently spring back to its original linear longitudinal shape. Subsequently, rope 158 is untied and the tool 20 is hoisted out of the manhole.

Some details of construction of tool 20 are as follows. Wire rope lengths 121 may be conveniently made from one inch wire rope, and the length of the tool may conveniently be about eight feet. The various sleeve and collar units of tool 20 may be made of cast aluminum except that is has been found convenient for the toggles 107 of the collar units to be brass. The diameter of the passages through the sleeves and collar units are, typically, about four inches. The gap between the opposite sides of slot 135a and slot 136a has a size of 0.045" which was found suitable for the particular lubricant which was used. The assure more uniform deposition over the lengths of these slots of lubricant into the cable, such gap size should be selected as a function of the lubricant's viscosity, being made larger when such viscosity is higher. The optional gap size for promoting such more uniform deposition for a lubricant of a particular viscosity can be readily determined by experimentation.

The above described embodiment being exemplary only, it will be appreciated that various alterations and modifications thereof may be made without departing from the spirit of the invention. Accordingly, the invention is not to be considered as limited save as is consonant with the scope of the following claims.

What is claimed is:

1. A cable feeding tool comprising, a pair of horizontally spaced wire rope lengths grouped together to constitute part of a horizontally elongated support frame resiliently warpable in the vertical plane into arcuate shapes, cable receiving and cable discharging sleeve units disposed mostly beneath and at opposite ends of said lengths in coupled relation with said lengths to be supported thereby and to form part of said frame, and a plurality of collar units disposed mostly beneath said lengths between said sleeve units in spaced relation therefrom and from each other and in coupled relation with said lengths to be supported thereby and to form part of said frame, said sleeve units and collar units having respective longitudinal passages therein for movement of a cable through said passages.

2. A tool according to claim 1 in which each of said collar units has, in the peripheral extent thereof around the passage therein, a gap adapted when open to permit sidewise movement of said cable through said gap into and out of said passage, and in which each such unit includes movable gap closure means selectively positionable to open said gap and to close it.

3. A tool according to claim 2 in which such gap closure means of each such collar unit comprises swingable arm means hingedly coupled on one side of said gap to said unit and latchably securable on the other side of said gap to said unit.

4. A tool according to any one of claims 1 to 3 inclusive in which each of said sleeve units includes an upper sleeve portion and a lower sleeve portion cooperable with said upper portion to jointly form a split sleeve unit, said lower portion being movable away from and toward said upper portion to permit, when moved away, sidewise insertion and removal of said cable into and out of said unit, and, when moved toward upper portion, to cause enclosure of said cable by said sleeve unit.

5. A tool according to any of claims 1 to 3 inclusive in which at least one of said cable sleeve units has formed, in the interior wall thereof bounding said passage therein, slot means extending at least partway around the periphery of said passage, and in which said unit includes means for producing a flow of lubricant through said slot means onto the exterior of said cable to lubricate the movement of said cable.

* * * * *